(12) United States Patent
Kim et al.

(10) Patent No.: US 10,694,544 B2
(45) Date of Patent: *Jun. 23, 2020

(54) METHOD AND APPARATUS FOR PERFORMING CONTENTION-BASED ACCESS IN A MOBILE COMMUNICATION SYSTEM

(71) Applicant: Samsung Electronics Co., Ltd., Suwon-si, Gyeonggi-do (KR)

(72) Inventors: Soeng Hun Kim, Suwon-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,342

(22) Filed: Mar. 29, 2019

(65) Prior Publication Data

US 2019/0230704 A1    Jul. 25, 2019

Related U.S. Application Data

(63) Continuation of application No. 15/971,361, filed on May 4, 2018, now Pat. No. 10,251,195, which is a
(Continued)

(30) Foreign Application Priority Data

Dec. 11, 2009    (KR) .................. 10-2009-0123138

(51) Int. Cl.
*H04W 74/08*    (2009.01)
(52) U.S. Cl.
CPC .................. *H04W 74/08* (2013.01)
(58) Field of Classification Search
CPC ......... H04L 47/10; H04L 47/35; H04L 47/30; H04L 47/32; H04L 47/20; H04L 5/14;
(Continued)

(56) References Cited

U.S. PATENT DOCUMENTS 6,459,680 B1    10/2002  Alperovich et al.
6,751,227 B1    6/2004   Ahmavaara et al.
(Continued)

FOREIGN PATENT DOCUMENTS

KR    10-2004-0102114 A    12/2004
KR    10-2005-0013872 A    2/2005
(Continued)

OTHER PUBLICATIONS

3GPP TS 36.321 V8.5.0;"Evolved Universal Terrestrial, Radio Access (E-UTRA), Medium Access Control (MAC) protocol specification", (Release 8), Mar. 2009, pp. 1-46, V8.5.0, 650 Route des Lucioles—Sophia Antipolis, Valbonne—France.

*Primary Examiner* — Mark H Rinehart
*Assistant Examiner* — Natali Pascual Peguero
(74) *Attorney, Agent, or Firm* — Jefferson IP Law, LLP

(57) ABSTRACT

The present invention relates to a method and apparatus in which a terminal performs contention-based access in a mobile communication system, wherein the method comprises: a sensing step of sensing whether or not contention-based access is allowed for at least one logical channel; a receiving step of receiving a contention-based reverse grant from a base station; and a transmitting step of transmitting data to the base station through the logical channel for which the contention-based access is allowed. According to the present invention, contention-based access can be efficiently performed, and the reliability of transmission can be ensured.

20 Claims, 17 Drawing Sheets

Related U.S. Application Data continuation of application No. 13/514,488, filed as application No. PCT/KR2010/008788 on Dec. 9, 2010, now Pat. No. 9,967,901.

(58) Field of Classification Search
CPC .............. H04M 3/561; H04Q 11/0428; H04Q 11/0407; H04W 80/04; H04W 72/04; H04W 36/18
USPC ....... 370/235, 236, 270, 278, 328, 329, 331, 370/360
See application file for complete search history.

(56) References Cited

U.S. PATENT DOCUMENTS

| | | |
|---|---|---|
| 7,580,388 B2 | 8/2009 | Kim |
| 2004/0047319 A1 | 3/2004 | Elg |
| 2004/0081133 A1 | 4/2004 | Smavatkul et al. |
| 2007/0042784 A1 | 2/2007 | Anderson |
| 2007/0184865 A1 | 8/2007 | Phan et al. |
| 2009/0109937 A1 | 4/2009 | Cave et al. |
| 2009/0225711 A1* | 9/2009 | Sammour ............... H04L 47/10 370/329 |
| 2009/0232095 A1 | 9/2009 | Ahn et al. |
| 2009/0280839 A1 | 11/2009 | Farnsworth et al. |
| 2010/0067470 A1 | 3/2010 | Damnjanovic et al. |
| 2010/0075678 A1 | 3/2010 | Akman et al. |
| 2010/0226325 A1 | 9/2010 | Chun et al. |
| 2011/0039568 A1 | 2/2011 | Zhang et al. |
| 2011/0090806 A1 | 4/2011 | Ozturk et al. |
| 2012/0044905 A1 | 2/2012 | Kim |

FOREIGN PATENT DOCUMENTS

| | | |
|---|---|---|
| KR | 10-2008-0026461 A | 3/2008 |
| KR | 10-2008-0041237 A | 5/2008 |
| KR | 10-2010-0119341 A | 11/2010 |
| WO | 2011/038780 A1 | 4/2011 |

\* cited by examiner

METHOD AND APPARATUS FOR PERFORMING CONTENTION-BASED ACCESS IN A MOBILE COMMUNICATION SYSTEM

CROSS-REFERENCE TO RELATED APPLICATION(S)

This application is a continuation application of prior application Ser. No. 15/971,361, filed on May 4, 2018, and continuation of prior application Ser. No. 13/514,488, filed on Jun. 7, 2012, which issued as U.S. Pat. No. 9,967,901 on May 8, 2018; which was the National Stage of International application PCT/KR2010/008788 filed on Dec. 9, 2010; which claimed priority under 35 U.S.C § 119(a) of a Korean patent application number 10-2009-0123138, filed on Dec. 11, 2009, in the Korean Intellectual Property Office, the disclosure of each of which is incorporated by reference herein in its entirety.

BACKGROUND OF THE INVENTION

Field of the Invention

The present invention relates to a mobile communication system and, in particular, to a method and apparatus for performing contention-based access in a mobile communication system.

Description of the Related Art

Mobile communication systems have developed to provide the subscribers with voice communication services on the move. With the advance of technologies, the mobile communications have been evolved to support high speed data communication services as well as the standard voice communication services.

Recently, as one of the next generation mobile communication system, Long Term Evolution (LTE) is on the standardization by the 3rd Generation Partnership Project (3GPP). LTE is a technology designed to provide high speed packet-based communication of up to 100 Mbps and aimed at commercial deployment around 2010 timeframe. As the LTE standard is on the verge of ratification, discussion is focused on LTE-advanced (LTE-A) with the adoption of various novel techniques to LTE. One of these novel techniques is the contention-based access.

Typically, since uplink transmission is performed through the dedicated resource allocated by a base station, collision does not take place in uplink transmission. In order to allocate transmission resource dedicatedly, however, the terminal has to request the base station for transmission resource allocation, resulting in increase of transmission delay. In order to overcome this problem, the base station may use a part of the transmission resource as contention-based access resource. The transmission resource known as contention-based access resource is freely used by the terminals having data to transmit. In uplink transmission using the contention-based transmission resource, collision is inevitably due to transmission attempts of a plurality of terminals. Since the contention-based transmission has low transmission reliability, it may cause significant side effect to allow the contention-based transmission for all the types of data without restriction.

DISCLOSURE OF INVENTION

Technical Problem

The present invention has been made in an effort to solve the above problem and it is an object of the present invention to provide a contention-based uplink transmission method and apparatus that is capable of improving uplink transmission efficiency of the contention-based transmission resource and guaranteeing transmission reliability.

Solution to Problem

In order to solve the above problem, a contention-based access execution method of a terminal in a mobile communication system includes a detection step of detecting whether contention-based access is allowed for at least one logical channel; a reception step of receiving a contention-based uplink grant from a base station; and a transmission step of transmitting data on a logical channel on which the contention-based access is allowed. In this case, the whether to allow the contention-based access is notified to the terminal by the base station through signaling (control message) or preconfigured between the terminal and base station at initial stage.

According to an embodiment of the present invention, the terminal may terminates the contention-based uplink transmission when the contention-based uplink transmission collides with Random Access Preamble transmission or message 3 transmission.

In accordance with another aspect of the present invention, A contention-based access execution method of a terminal in a mobile communication system includes a step of checking, when data to be transmitted occurs, whether data to be transmitted through Signaling Radio Bearer 0 (SRB0) channel exists, a step of terminating, when the data to be transmitted through the SRB0 channel, monitoring receipt of a contention-based uplink grant from a base station, and a step of monitoring, when the data to be transmitted through the SRB0 channel, receipt of the contention-based uplink grant from the base station.

In order to solve the above problem, a terminal for performing contention-based access in a mobile communication system includes a transceiver which transmits and receives data or control information through a radio channel, and a contention-based access controller which controls detecting whether contention-based access is allowed for at least one logical channel, receiving a contention-based uplink grant from a base station, and transmitting data on a logical channel on which the contention-based access is allowed. In this case, the whether to allow the contention-based access is notified to the terminal by the base station through signaling (control message) or preconfigured between the terminal and base station at initial stage.

According to an embodiment of the present invention, the terminal may terminates the contention-based uplink transmission when the contention-based uplink transmission collides with Random Access Preamble transmission or message 3 transmission.

In accordance with another aspect of the present invention, a terminal for performing contention-based access in a mobile communication system includes a transceiver which transmits and receives data or control information through a radio channel, and a contention-based access controller which controls checking, when data to be transmitted occurs, whether data to be transmitted through Signaling Radio Bearer 0 (SRB0) channel exists, terminating, when the data to be transmitted through the SRB0 channel, monitoring receipt of a contention-based uplink grant from a base station; and monitoring, when the data to be transmitted through the SRB0 channel, receipt of the contention-based uplink grant from the base station.

ADVANTAGEOUS EFFECTS

The present invention is capable of performing contention-based access efficiently while securing transmission reliability.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention proposes a method and apparatus for guaranteeing reliability in uplink transmission through contention-based access transmission resource in which a terminal select the data to be transmitted in contention-based uplink transmission and transmit the data in uplink.

Figure 1:
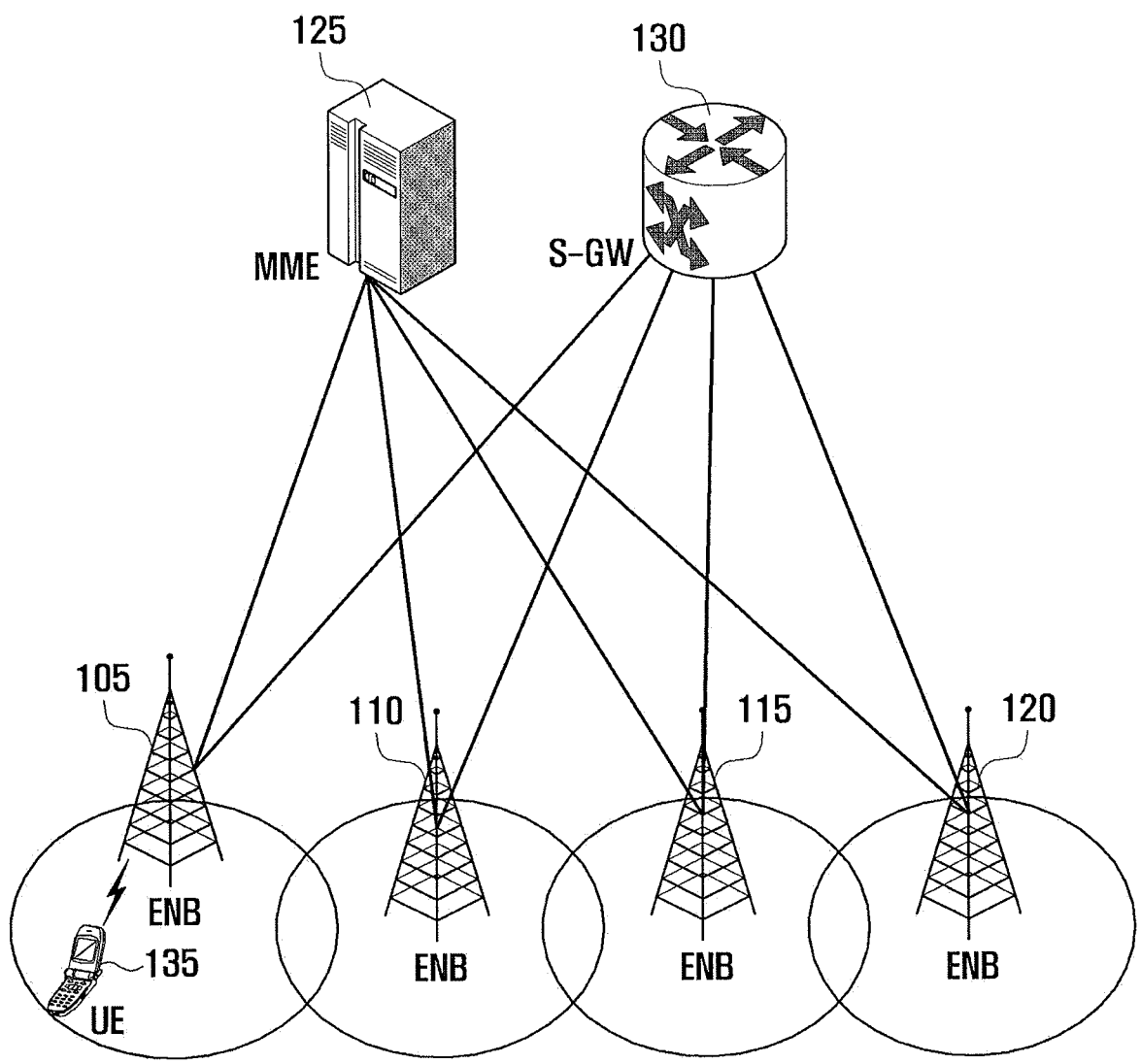
FIG. 1 is a diagram illustrating a structure of the LTE mobile communication system.
Figure 2:
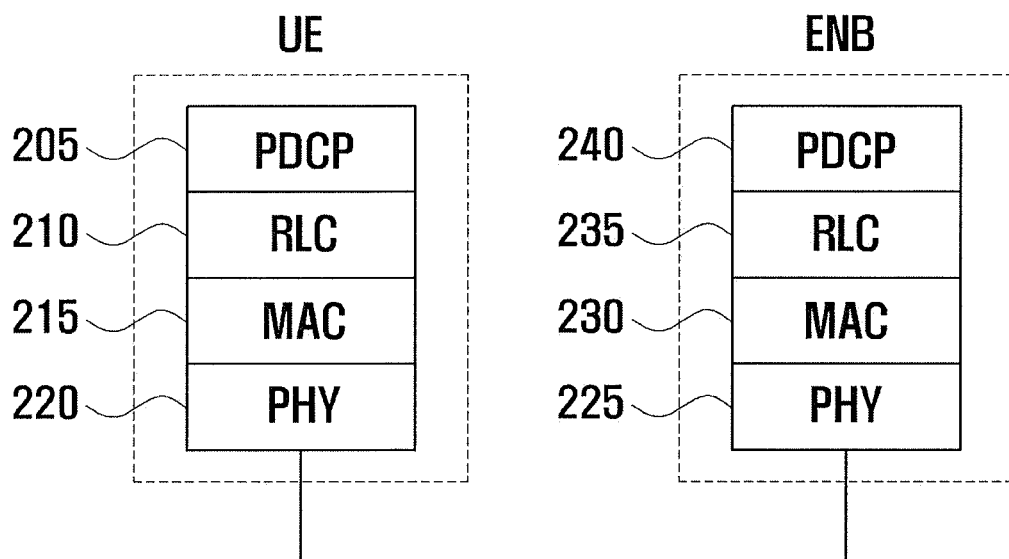
FIG. 2 is a diagram illustrating a protocol stack of the LTE system to which the present invention is applied.
Figure 3:
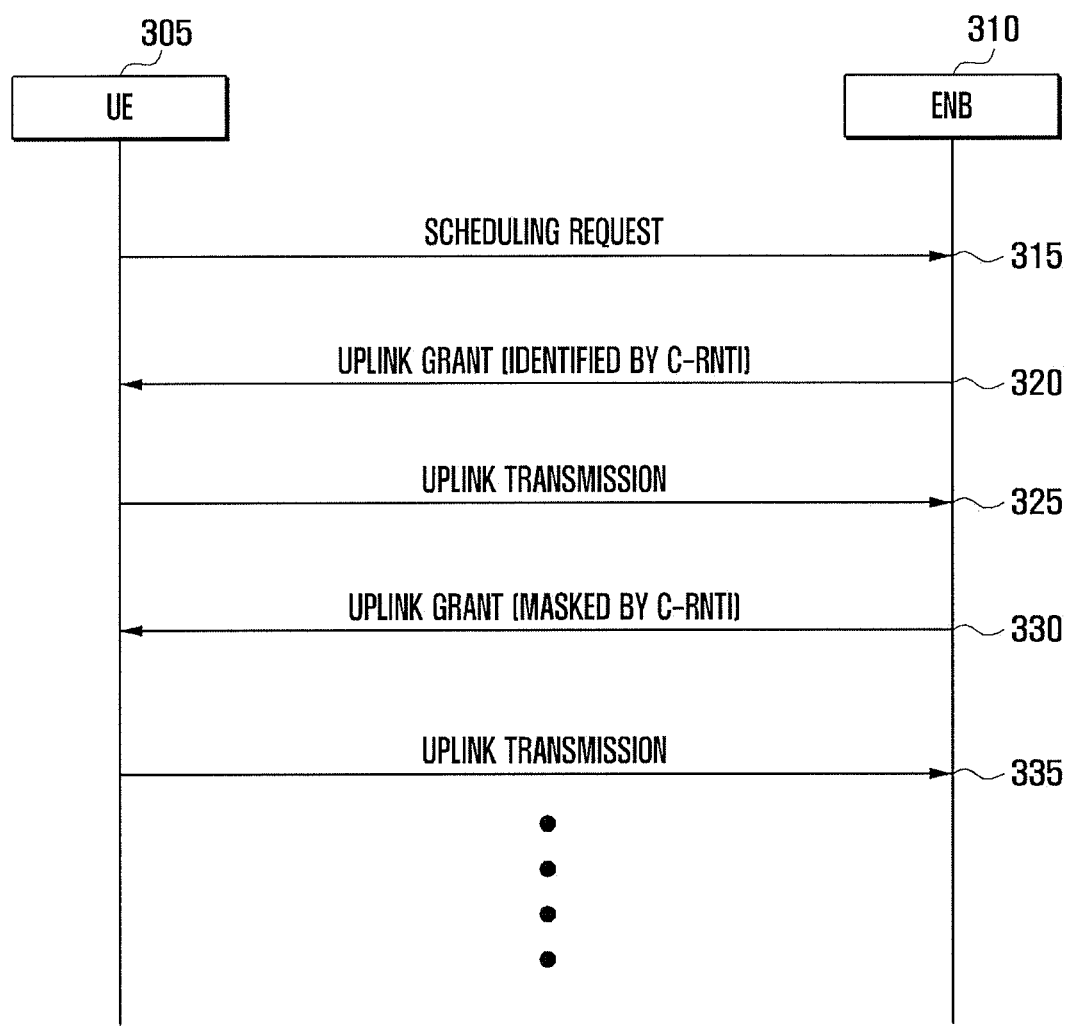
FIG. 3 is a signaling diagram illustrating conventional uplink transmission procedure in the LTE mobile communication system.

Before starting the explanation of the present invention, a description is made of the LTE mobile communication system with reference to FIGS. 1, 2, and 3. FIG. 1 is a diagram illustrating a structure of the LTE mobile communication system.

Before starting the explanation of the present invention, a description is made of the LTE mobile communication system with reference to FIGS. 1, 2, and 3.

FIG. 1 is a diagram illustrating a structure of the LTE mobile communication system.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105~120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs.

FIG. 2 is a diagram illustrating a protocol stack of the LTE system to which the present invention is applied.

As shown in FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. In view of transmission, the data input to a protocol entity is referred to as Service Data Unit (SDU), and the data output by the protocol entity is referred to as Protocol Data Unit (PDU).

FIG. 3 is a signaling diagram illustrating conventional uplink transmission procedure in the LTE mobile communication system.

If a predetermined condition such as occurrence of transmission data is fulfilled, the UE 305 sends the eNB a scheduling request to request for transmission resource (315). Hereinafter, when it becomes necessary to transmit the scheduling request, it is expressed as "scheduling request is triggered," and the terms "scheduling request" and "SR" are used interchangeably. A scheduling request is classified into one of Dedicated Scheduling Request (D-SR) and Random Access Scheduling Request (RA-SR). D-SR is the scheduling request transmitted on the dedicated transmission resource allocated to the UE. The D-SR transmission resource is the dedicated transmission resource arriving periodically to carry 1 bit information. The UE occupying the D-SR transmission resource transmit D-SR when it is necessary to transmit scheduling request. D-SR transmission resource may not be allocated all the UEs, and the UE having no D-SR transmission resource notifies the eNB of the occurrence of transmission data through random access procedure, i.e. RA-SR transmission.

Upon receipt of the scheduling request signal, the eNB 310 allocates uplink transmission resource to the UE 305. The uplink transmission resource is allocated by means of an uplink grant which is transmitted to the UE 305 on Physical Downlink Control Channel (PDCCH) (320). The uplink grant includes a Cell-Radio Network Temporary Identity (C-RNTI) as the UE identifier so as to be addressed to the UE allocated the C-RNTI. The uplink grant includes information on the transmission resource for the uplink transmission of the UE 305 and MCS to be applied to the uplink transmission and the information necessary for HARQ operation such that the UE 305 performs uplink transmission at a time point elapsed a predetermined period since the time point when the uplink grant has been received according to the information. As far as the UE 305 has the data to transmit, the eNB 310 may continue transmitting the uplink grant to the UE.

Figure 4:
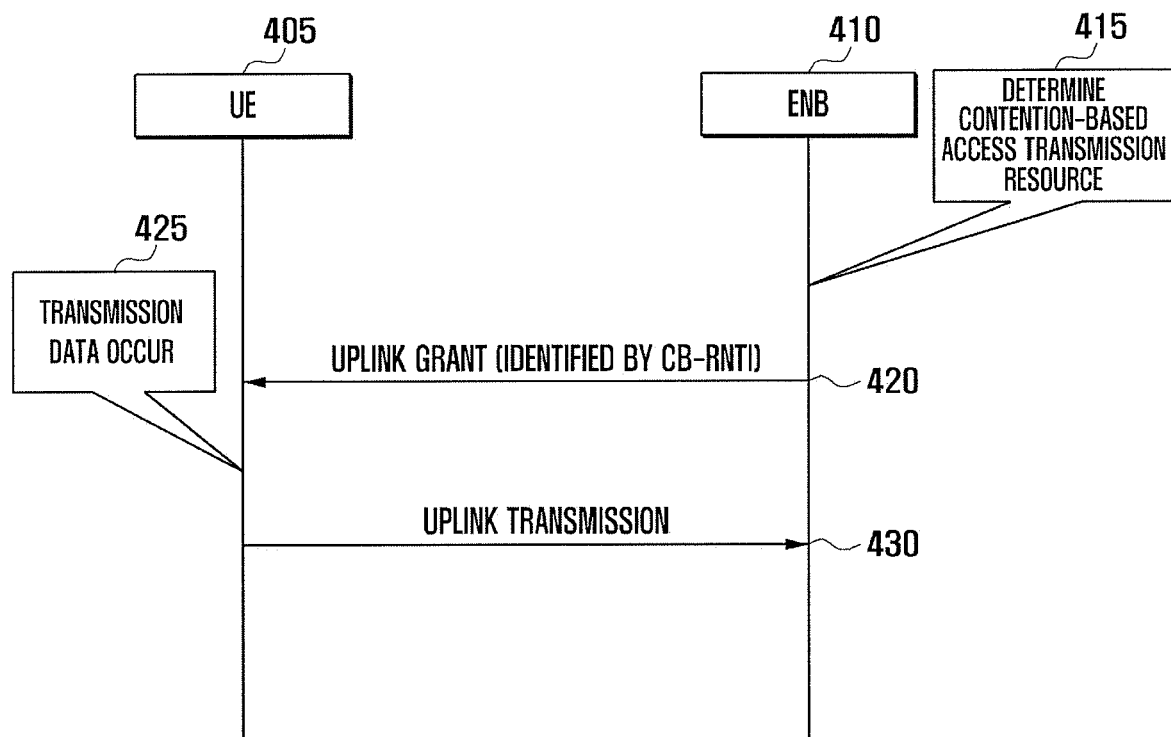
FIG. 4 is a signaling diagram illustrating a contention-based access operation briefly.

FIG. 4 is a signaling diagram illustrating a contention-based access operation briefly.

The eNB 410 determines scheduling the contention-based access transmission resource at certain timing (415). This timing is of the case where the load of the cell is not heavy and there is the resource remained without being allocated to UEs. The contention-based access transmission resource is the transmission resource allocated to unspecific UEs so as to be allocated with pre-notified (or informed to the UE in connected state individually) other than C-RNTI. This identifier is referred to as Contention-Based Radio Network Temporary Identity (CB-RNTI). The eNB 401 transmits the uplink grant with CB-RNTI at step 420. Hereinafter, the terms "CB-RNTI-identified uplink grant" and "contention-based uplink grant" are used interchangeably. Upon receipt of the contention-based uplink grant, the UE 405 transmits data, if exist (425), using the contention-based uplink grant (430).

If there is data to be transmitted and if a number of UEs received the contention-base uplink grant is greater than 1, collision occurs among uplink transmissions at step 430, resulting in increase of transmission failure probability. Also, the contention-based transmission of data requiring high reliability may cause a significant problem in communication procedure.

First Embodiment

There are many types of uplink data transmitted from the UE to the eNB, and these uplink data are processed through predetermined logical channels respectively. The logical channel is composed of PDCH entity and RLC entity for processing data requiring specific QoS, one logical channel is established for one service in general. Accordingly, the data transmitted or received through one logical channel may having different importance or QoS requirement, and the contention-based transmission of data on a specific logical channel may not fulfill the QoS required. Representatively, the RRC connection establishment request message or RRC connection re-establishment request message is transmitted through a logical channel referred to as Signaling Radio Bearer (SRB) 0 of which RLC entity operates in RLC Transparent Mode (TM) and does not support ARQ. If an important control message transmitted in RLC TM is transmitted in contention-based scheme, this may increases the failure probability of RRC connection establishment procedure or RRC connection reestablishment procedure. For another example, in VoIP operating in RLC Unacknowledged Mode (UM) supporting no ARQ, if VoIP packets are transmitted in contention-based scheme the transmission failure caused by collision increases the probability of unsatisfying the required transmission reliability.

The first embodiment of the present invention proposes a method and apparatus for performing contention-based transmission only when predetermined conditions are fulfilled, e.g. the contention-based transmission causes no redundant padding and transmission power shortage, while ruling out the contention-based transmission of the data occurred on a predetermined logical channel, thereby avoiding inefficiency of the contention-based transmission.

Figure 5:
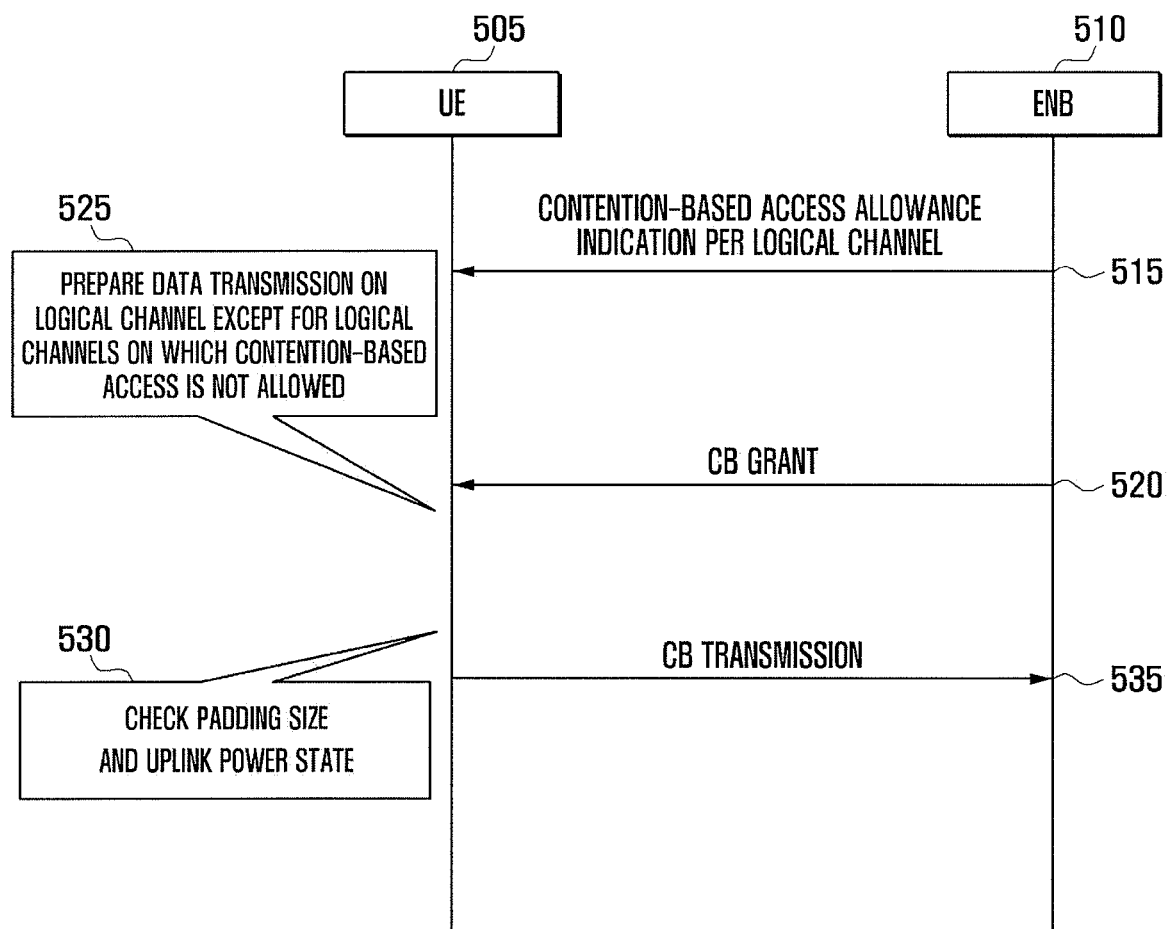
FIG. 5 is a signaling diagram illustrating the contention-based transmission procedure according to the first embodiment of the present invention.

FIG. 5 is a signaling diagram illustrating the contention-based transmission procedure according to the first embodiment of the present invention.

The eNB 510 informs the UE 505 of the contention-based access availability per logical channel through a call setup process (515). As described above, it is preferred to restrict the contention-based access on the logical channel for which ARQ function is not provided with high data rate. Instead that the eNB configure the logical channel which does not allow contention-based access, it can be another approach to block the contention-based access always on a specific logical channel. For example, one of the following two rules can be used.

[Rule 1 for Determining Whether to Allow Contention-Based Access Per Logical Channel]

The contention-based access is not allowed for the data occurring on the SRB 0.

According to the determination rule 1, the UE having only the data occurred on the SRB 0 neither attempts contention-based access nor monitor the CB-RNTI.

[Rule 2 for Determining Whether Allow Contention-Based Access Per Logical Channel]

The contention-based access is not allowed for the data occurring on the logical channel operating in RLC TM or RLC UM.

According to the determination rule 2, the UE having only the data occurring on the logical channel operating in RLC TM or RLC UM neither attempts contention-based access nor monitors the CB-RNTI.

In case that a logical channel which allows no contention-based access is designated by the eNB directly rather than a certain rule, the UE neither attempts contention-based access nor monitors the CB-RNTI.

If it is notified that logical channels are configured and which logical channels are allowed or not for the contention-based access, the UE 505 starts monitoring CB-RNTI when a predetermined condition is fulfilled. If CB-RNTI is monitored, this means to monitor the receipt of an uplink grant identified with CB-RNTI on the downlink control channel.

If the contention-based uplink grant is received at step 520, the UE 505 configures MAC PDUs using the data on the logical channels with the exception of the logical channels that are not allowed for contention-based access at step 525. The step for determining the amount of the data to be transmitted per logical channel in match with the transmission resource and format indicated by the uplink grant is referred to as logical channel prioritization (LCP) process. The UE rules out the logical channels that are not allowed for the contention-based access in LCP process so as to exclude the data of the logical channel not allowed for contention-based access from the uplink data transmitted in contention-based transmission mode.

The UE 505 checks the amount of padding to be included in the MAC PDU to be transmitted and the uplink transmission power required in the MAC PDU transmission to determine contention-based uplink transmission.

Figure 6:
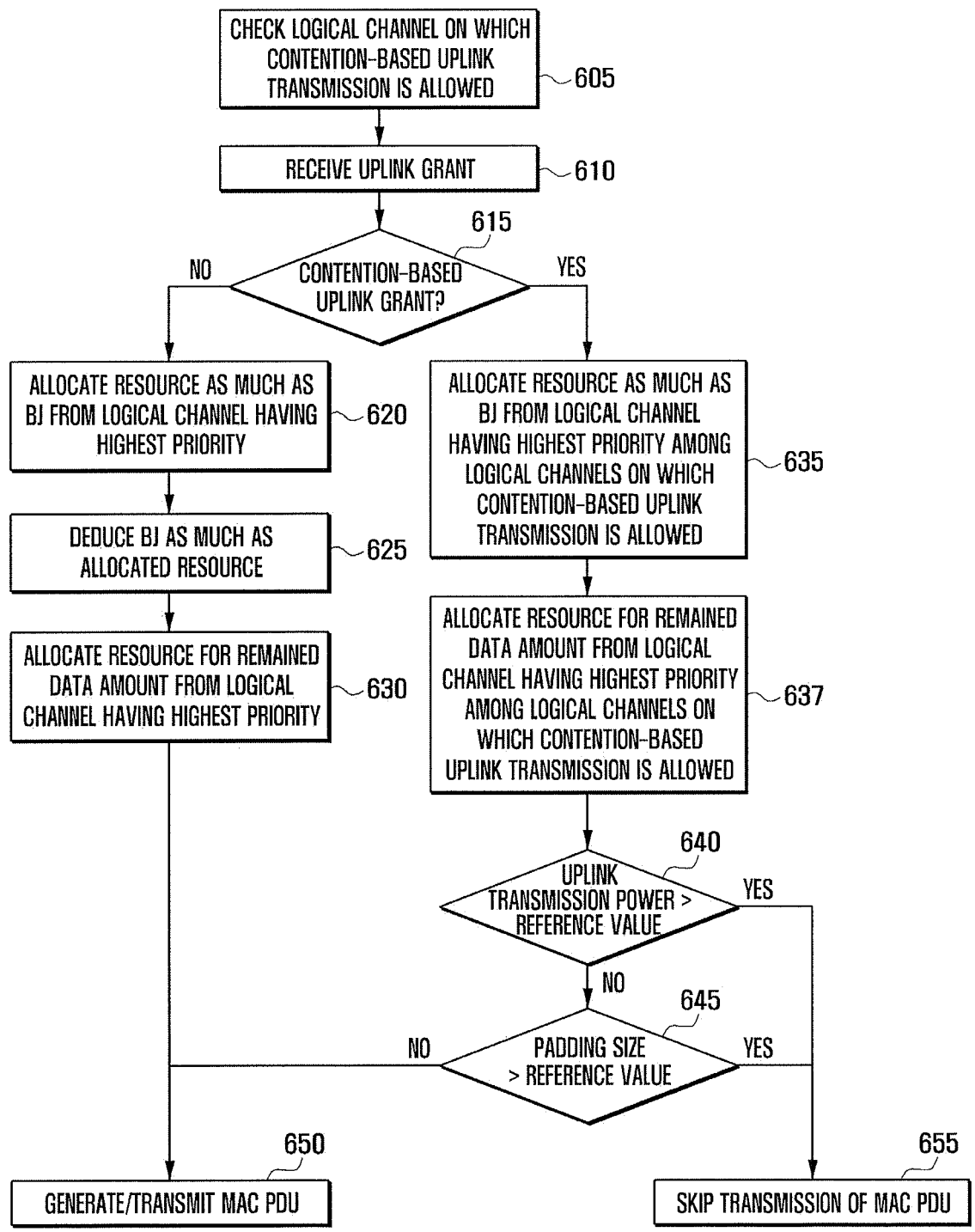
FIG. 6 is a flowchart illustrating an operation order of the UE according to the first embodiment of the present invention.

FIG. 6 is a flowchart illustrating an operation order of the UE according to the first embodiment of the present invention.

The UE 505 discriminate between the logical channels allowed for contention-based access and the logical channels not allowed for contention-based access at step 605. Whether to allow contention-based access may be configured based on a control message per logical channel or predetermined for specific logical channels (e.g. SRB 0).

If an uplink grant is received at step 610, the UE determines whether the received uplink grant is the contention-based uplink grant or the normal uplink grant at step 615; and if normal uplink grant, the procedure goes to step 620 and, otherwise, step 635.

Steps 620, 625, and 630 are the LCP process performed when the UE 505 has received the normal uplink grant, and this process is specified in section 5.4.3.1 of the standard technical specification 36.321. In brief, the UE 505 allocates resource in amount as much as Bj to the logical channel having highest priority at step 620. After subtracting the allocated amount from the entire resource, the remained resource, if any, is allocated to the channel having the next highest priority as much as Bj. The UE 505 repeats this operation until no resource is remained or all of the logical channels are allocated the resource. The priority is assigned per logical channel in call setup process in the range from 0 to 7. Bj denotes a token managed per logical channel. The token is used to guarantee the minimum bit rate per logical channel and increases by a predetermined size every subframe and, if data are transmitted on the corresponding logical channel, reduced as much as the transmitted data.

After completing the resource allocation at step 620, the UE deduces the resource allocated in Bj per logical channel at step 625. If there is the resource remained after allocating for all the logical channels having Bj, the UE allocates the remained resource from the logical having the highest priority until the remained resource exhausts. The UE configures the RLC PDUs per logical channel in match with the resource size allocated per logical channel through PCP process at step 650 and transmits the RLC PDUs multiplexed in MAC PDUs. If the transmission resource is left because the allocated resource is greater than the data amount to be transmission, the remained resource is filled with padding bits.

If the received uplink grant is the contention-based uplink grant, the UE 505 performs LCP in consideration of only the logical channels on which the contention-based access is allowed at step 635. By taking notice of high transmission failure probability of the contention-based access, Bj is not deduced. The UE 505 allocates resource of the logical channels in a descending order of priority of the logical channels, with the exception of the logical channels on which the contention-based access is not allowed, in size as much as Bj. The resource is deduced as much as allocated, and the resource remained after deduction is allocated to the logical channel having the next highest priority as much as Bj among the contention-based uplink transmission is allowed. The UE repeats this operation until the resource exhausts or all of the logical channels having Bj among the logical channel on which the contention-based uplink transmission is allowed are allocated resources.

As described above, since it is preferred to do not reduce Bj from the contention-based transmission, the UE 505 skips deducing Bj and allocates the transmission resource to the logical channels on which contention-based uplink grant is allowed in order of priority at step 637. Once the LCP process completes at steps 635 and 637, the UE 505 determines whether to perform the contention-based uplink transmission as step 640. At step 640, the UE 505 determines whether the uplink transmission power required for uplink transmission according to the contention-based uplink grant is greater than a reference value and, if so, the procedure goes to step 655 and, otherwise, step 645. The reference value is a threshold value for determining inefficiency when the uplink transmission power is greater than the threshold value, e.g. maximum transmission power of the UE 505. Or, it can be a predetermined rate of the maximum transmission power of the UE 505. The UE 505 compares the amount of the padding bits to be included in the MAC PDU to be transmitted in uplink transmission according to the contention-based grant with a predetermined reference value at step 645 and, if the amount of the padding bits is greater than the reference value, gives up the uplink transmission at step 655 and otherwise if the amount of the padding bits is equal to or less than the reference value, generates and transmits a MAC PDU at step 650. The reference value is the threshold value for determining the inefficiency of the uplink transmission, when the amount of the padding bits is greater than the threshold value, and can be set to a certain value by the a network operator. If padding occurs, this means basically that the uplink transmission is inefficient such that it is possible for only the UE having the data large enough to be transmitted without padding to perform the contention-based uplink transmission by setting the reference value to 0 byte. Also, the reference value can be set to an integer according to the resource management policy of the network operator or an occupancy rate of the padding in the MAC PDU. For example, it can be configured for the contention-based uplink transmission to be performed when the padding is equal to or less than n bytes or the occupancy rate of the padding in the MAC PDU is equal to or less than m %.

Second Embodiment

Figure 7:
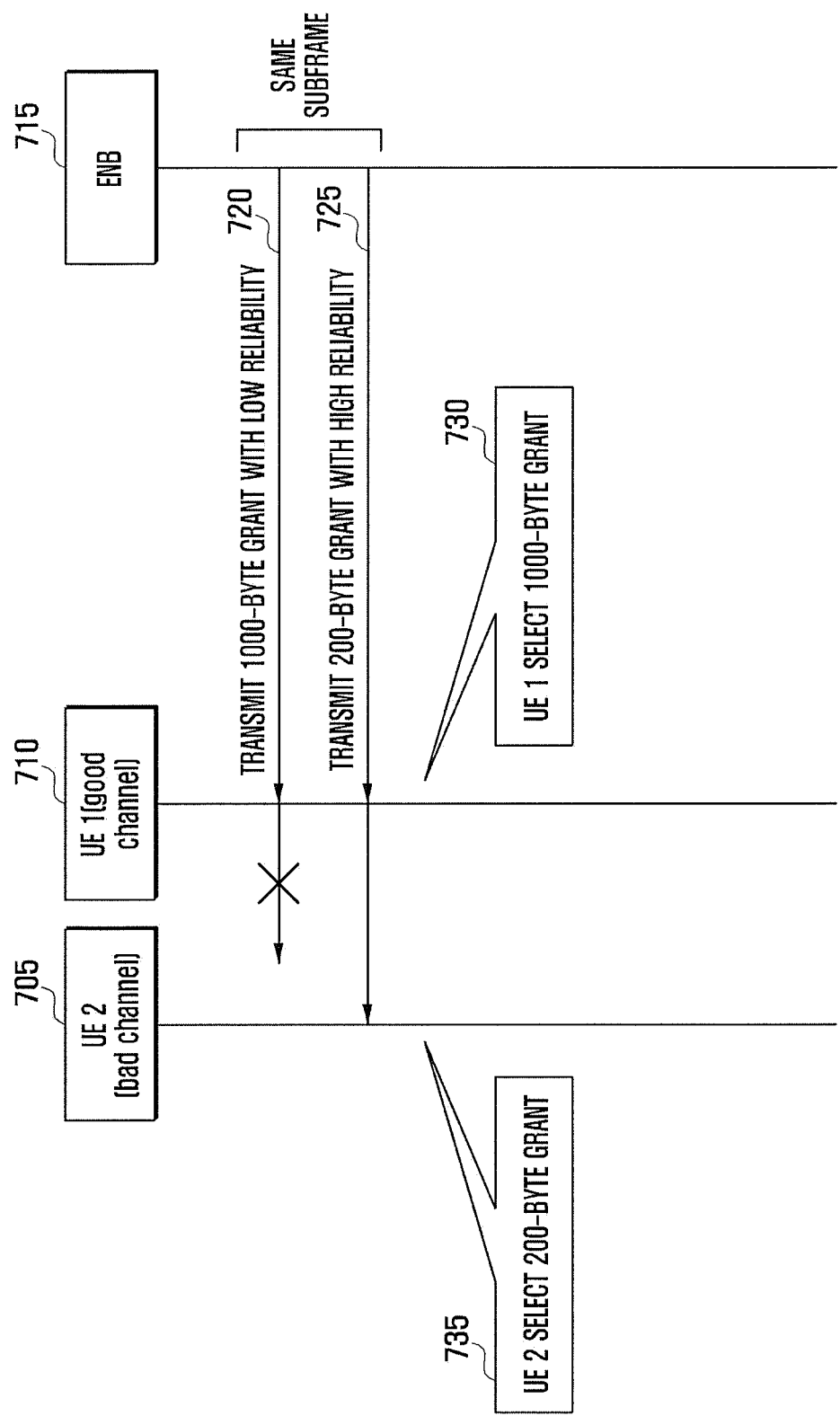
FIG. 7 is a signaling diagram illustrating a contention-based transmission procedure according to the second embodiment of the present invention.

FIG. 7 is a signaling diagram illustrating a contention-based transmission procedure according to the second embodiment of the present invention.

A description is made of the contention-based transmission procedure according to the second embodiment with reference to FIG. 7. If several resources are left without use at a certain time point, the eNB may generates several contention-based grants simultaneously. As a consequence, the UE may receive several contention-based uplink grants simultaneously. At this time, the UE has to select one uplink grant in any way. The simplest method is to select an uplink grant randomly. Although the random selection is simple, it is not a good way in view of the transmission efficiency.

In order to overcome this, in the second embodiment, when multiple contention-based uplink grants are received simultaneously, the UE selects the contention-based uplink grant allowing the largest amount of data transmission. If there are multiple contention-based uplink grants fulfilling this condition, the UE selects an uplink grant in consideration of its channel state. In the system selecting the contention-based uplink grant allowing the largest amount of data transmission, the contention-based uplink grant indicating the largest amount of data transmission is likely to be selected by multiple UEs. The eNB applies a high channel coding rate to the uplink grant signal such that the contention-based uplink grant indicating the largest data transmission amount is selected by the UEs having good channel states. Likewise, the eNB applies a low channel coding rate to the uplink grant signal such that the contention-based uplink grant indicating low data transmission amount is selected by the UEs having bad channel states as well as the UEs having the good channel states.

For example, suppose that the UE 1 710 has good channel state, the UE 2 705 has band channel state, and the eNB 715 transmits a contention-based uplink grant indicating data amount of 200 bytes in a certain subframe and another contention-based uplink grant indicating data amount of 1000 bytes. In this case, the eNB 715 transmits the 1000-byte grant with low reliability at step 720 such that only the UE 710 having good channel state can receive. Meanwhile, the eNB 715 transmits the 200-byte grant with high reliability at step 725 such that the UEs 705 having band channel state can receive too. The UE 1 710 having good channel state receives both the 200-byte grant and 1000-byte grant and selects the 1000-byte grant allowing relatively large amount of data transmission (730). Meanwhile, the UE 2 705 having band channel state receives only the 200-byte grant and selects the 200-byte grant with no choice (735).

Figure 8:
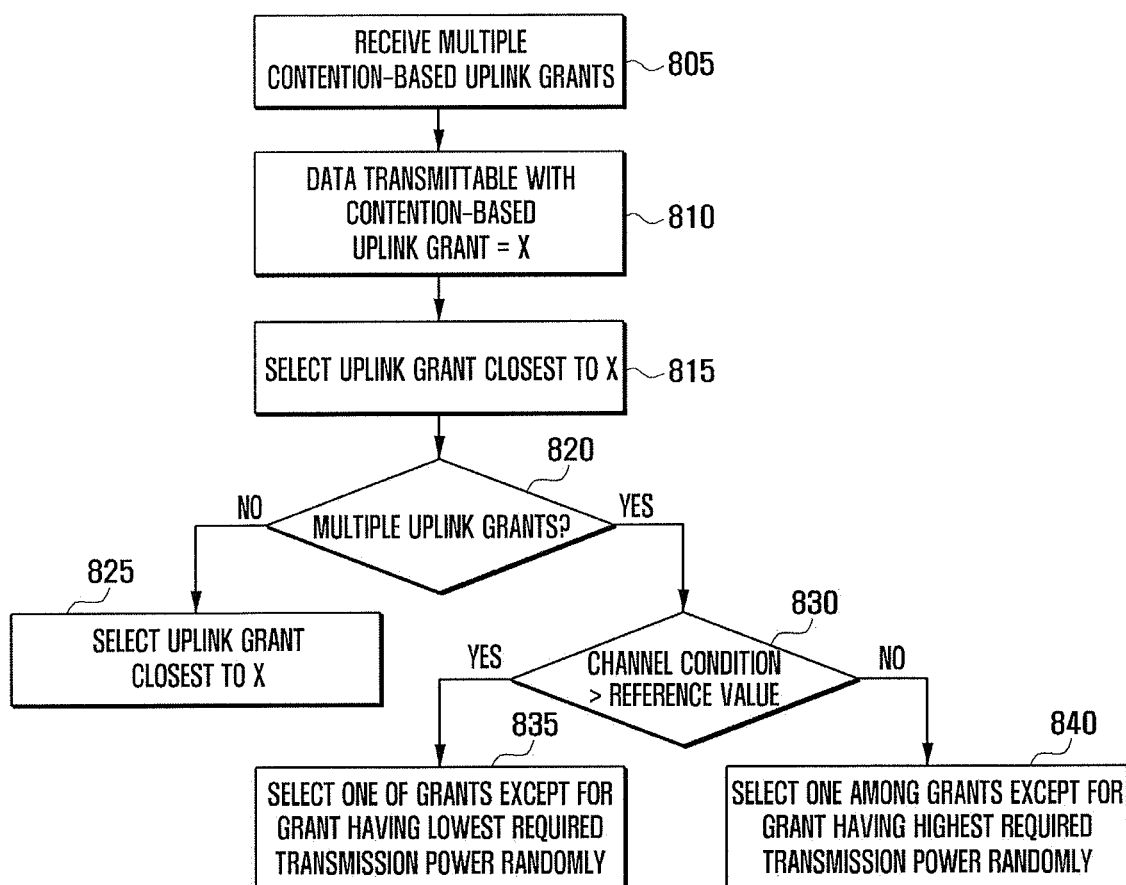
FIG. 8 is a flowchart illustrating a procedure of the UE according to the second embodiment of the present invention.

FIG. 8 is a flowchart illustrating a procedure of the UE according to the second embodiment of the present invention.

If multiple contention-based uplink grants are received at step 805, the UE 705 or 710 calculates the data amount to be transmitted based on the contention-based uplink grants and input the value to the variable X. for example, the data amount indicated by the contention-based uplink grant may be the total amount of the transmittable data stored in the logical channel on which the contention-based uplink transmission. The UE 705 or 710 selects the uplink grant closest to x in transmission data amount among the uplink grants passed validity test at step 815. For example, if the data amount transmittable in contention-based transmission mode is 100 bytes, if four contention-based uplink grants are received, if one contention-based uplink grant indicates 50 types of data transmission, and if the other three uplink grants indicate 90 bytes of data transmission, the UE 705 or 710 selects the contention-based uplink grants indicating the data amount of 90 bytes that are closest to the 100 types. The UE 705 or 710 determines whether multiple contention-based uplink grants are selected at step 820. If only one contention-based uplink grant is selected, the UE 705 or 710 selects the contention-based uplink grant at step 825 and performs uplink transmission according to the selected uplink grant. If multiple contention-based uplink grants are selected, the UE 705 or 710 selects one of the multiple contention-based uplink grants at step 830. At step 830, the UE 705 or 710 determines whether the current channel condition is better than a predetermined reference value. The reference value may be notified to the UE 705 or 710 in call setup procedure. The channel condition can be determined based on a pathloss value. For example, if the pathloss is greater than the reference value, this means bad channel condition and, otherwise if the pathloss is less than the reference value, this means good channel condition. If the channel condition is worse than the reference value, the UE 701 or 710 goes to step 840. If the channel condition is bad, this means that the UE 705 or 710 is located at the cell edge such that the high transmission power may cause interference to other cells. In order to minimize the interference to other cells, the UE 705 or 710 selects one of the contention-based uplink grants randomly with the exception of the contention-based uplink grant indicating the highest transmission power. The contention-based uplink grant indicating the highest transmission power is the uplink grant requiring small resource amount and high MCS level. If the required transmission powers of the selected contention-based uplink grants are identical among each other, i.e. require the same transmission resource amount and MCS level, the UE 705 or 710 selects one of the selected contention-based uplink grants. If the channel condition is better than the reference value, the UE goes to step 835. At step 835, the UE 705 or 710 selects one of the grants randomly, with the exception of the contention-based uplink grant indicating the lowest required transmission power, in order to avoid increase of the selection probability of the grant indicating low required transmission power. If the required transmission powers indicating the selected contention-based uplink grants are identical among each other, the UE 705 or 710 selects one of all the selected contention-based uplink grants.

Figure 9:
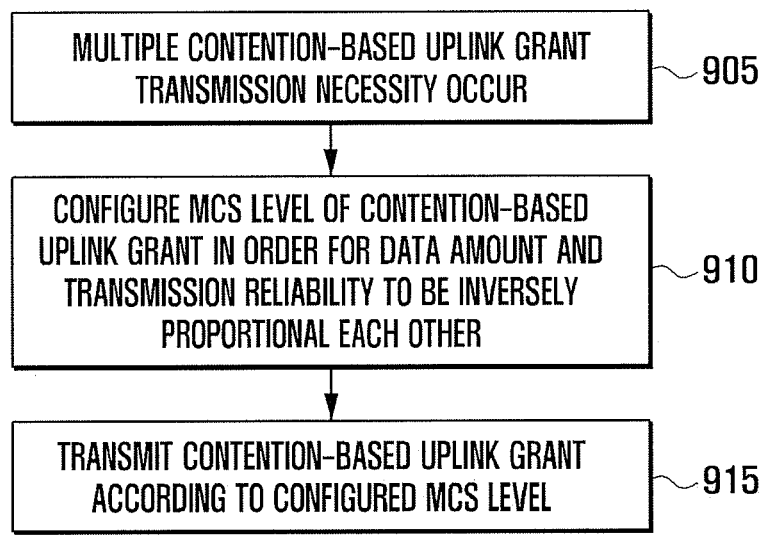
FIG. 9 is a flowchart illustrating a procedure of the UE 715 according to the second embodiment of the present invention.

FIG. 9 is a flowchart illustrating a procedure of the UE 715 according to the second embodiment of the present invention.

If multiple contention-based uplink grants transmission necessity occurs at step 905, the eNB 715 goes to step 910. For example, if the resources remained without use are distributed over multiple frequency bands, the eNB 715 may determines that the multiple contention-based uplink grants transmission necessity has occurred. The eNB 715 determines the MCS level of the contention-based uplink grant such that the transmission data amount to be indicated by the contention-based uplink grant and the reliability of the uplink grant are inversely proportional with each other. For example, a high MCS level is determined for the contention-based uplink grant indicating 1000-byte data transmission while a low MCS level is determined for the contention-based uplink grant indicating 200-byte data transmission. The eNB transmits the contention-based uplink grant with the determined MCS level at step 915.

Third Embodiment

Typically, the random access procedure performed to transmit an important control message. The random access procedure is composed of transmitting a Random Access Preamble, receiving a Random Access Response message, and transmitting message 3. The UE which is in the middle of or initiating the random access procedure may receive a contention-based uplink grant. If the contention-based uplink grant for performing contention-based uplink transmission is received in the subframe carrying the Random Access Preamble or message 3, the UE has to determine whether to continue the random access procedure or initiate the contention-based uplink transmission.

The third embodiment of the present invention proposes a UE operation when the uplink transmission required in the random access procedure is overlapped with the contention-based uplink transmission.

Figure 10:
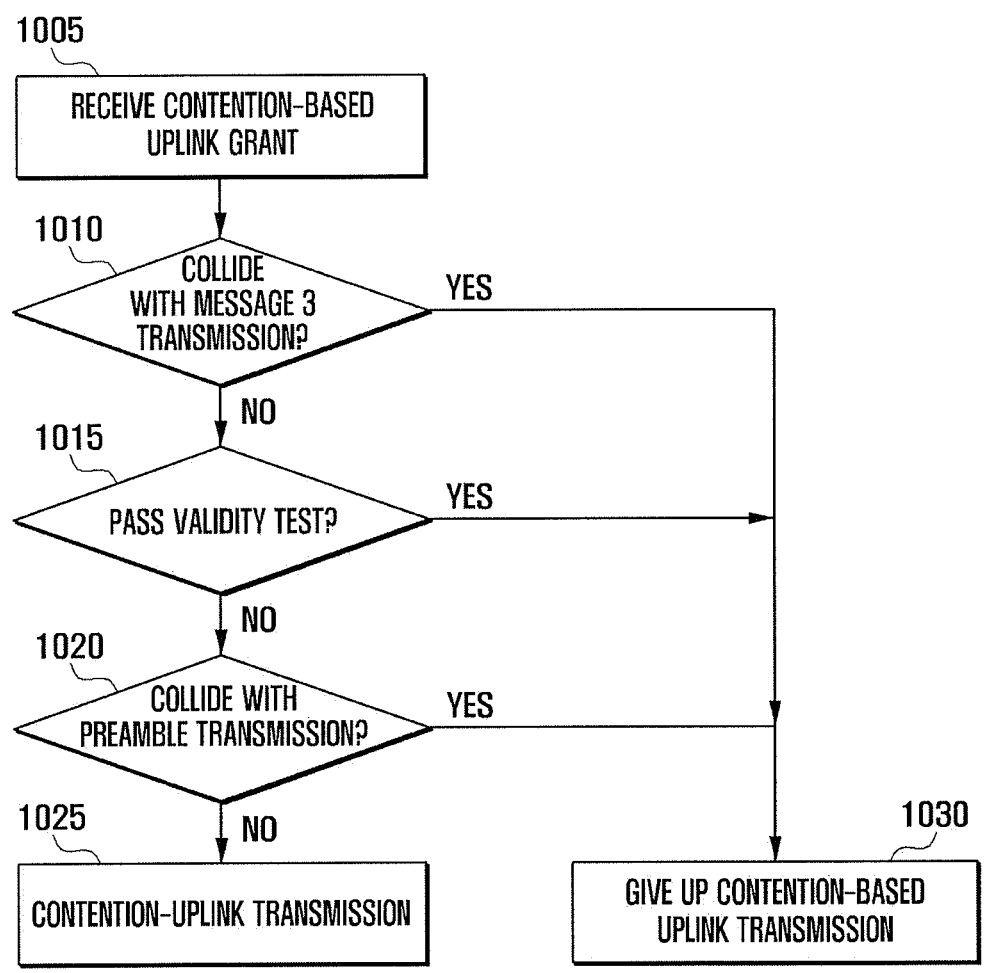
FIG. 10 is a flowchart illustrating a procedure of the UE according to the third embodiment of the present invention.

FIG. 10 is a flowchart illustrating a procedure of the UE according to the third embodiment of the present invention.

If the contention-based uplink grant is received at step 1005, the UE checks whether the subframe carrying the uplink transmission is identical with the subframe carrying the message 3 at step 1010. If the two subframes are identical with each other, the UE determines that the received contention-based uplink grant is an invalid uplink grant and gives up the contention-based uplink transmission at step 1030.

If the subframe for uplink transmission and the subframe for transmitting the message 3 differ from each other and if the contention-based uplink grant is selected, the UE performs validity test on the contention-based uplink grant by comparing the padding bits amount to occur and uplink transmission power with respective reference values at step 1015. If it is determined that the received contention-based uplink grant is valid, the procedure goes to step 1020 and, otherwise if it is determined that the contention-based uplink grant is invalid, step 1030.

At step 1020, the UE determines whether to transmit the preamble in the subframe in which contention-based uplink transmission is performed right before the contention-based uplink transmission. If the random access procedure is triggered due to a certain reason, the UE transmits the Random Access Preamble in the subframe closest to the corresponding time point among the subframes capable of transmitting the Random Access Preamble. The random access procedure can be triggered at any time such that the check on whether the contention-based uplink transmission and the Random Access Preamble transmission are scheduled in the same subframe is performed at an imminent timing of the contention-based uplink transmission.

If the contention-based uplink transmission and the Random Access Preamble transmission are scheduled in the same subframe, the UE gives up the contention-based uplink transmission at step 1030 and, if the Random Access Preamble transmission is not scheduled in the subframe in which the contention-based uplink transmission is scheduled, the UE performs the contention-based uplink transmission at step 1025.

Fourth Embodiment

In order to transition to connected state, the UE in idle state transmits an RRC CONNECTION SETUP REQUEST message to the eNB. The UE in connected state but temporarily in service failure state transmits a CONNECTIONE REESTABLISHMENT REQUEST message to the eNB in order to recover the connection. If these messages are transmitted through contention-based access, it is likely to fail transitioning to the connected state or recovering the connection due to transmission failure.

In the fourth embodiment of the present invention, if transmission data occur, the UE determines whether there is SRB 0 data currently in waiting for transmission. If there is SRB 0 data in waiting for transmission, the UE gives up the contention-based access for preventing the data from being transmitted in contention-based mode. If there is no SRB 0 data in waiting for transmission, the UE starts the procedure for contention-based access.

Figure 11:
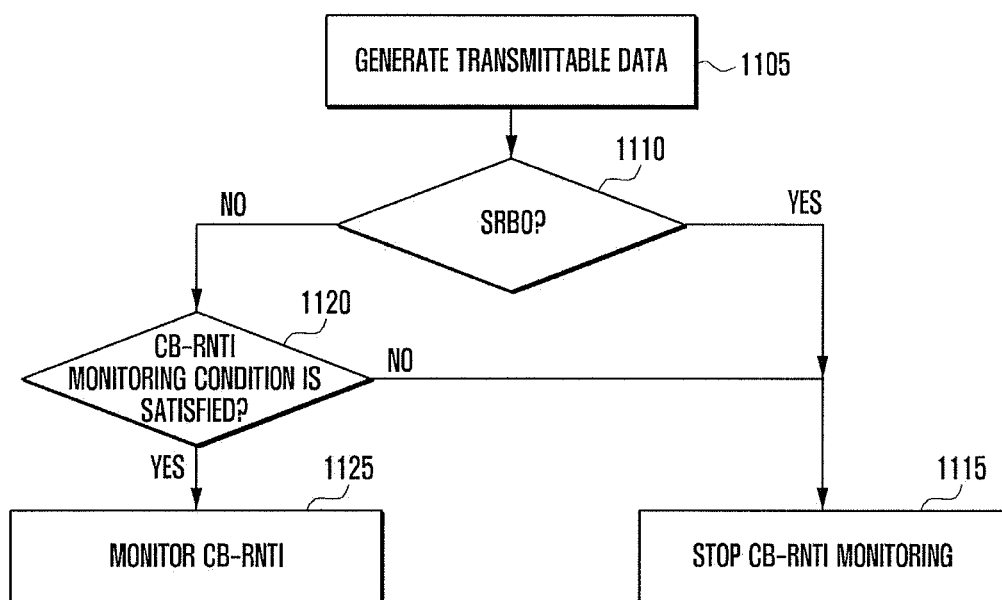
FIG. 11 is a flowchart illustrating a procedure of the UE according to the fourth embodiment of the present invention.

FIG. 11 is a flowchart illustrating a procedure of the UE according to the fourth embodiment of the present invention.

If transmittable data occurs in the UE at step 1105, the UE determines whether there is the data to be transmitted on the SRB 0 at the corresponding timing at step 1110. Since the SRB 0 is the logical channel having the highest priority among all the logical channels, if a contention-based uplink grant is received while the SRB 0 data is in waiting for transmission, the UE transmits the SRB 0 data in contention-based mode through normal logical channel selection process. In order to prevent this, the UE goes to step 1115 when there is the data to be transmitted on the SRB 0.

At step 1115, if it is monitoring CB-RNTI, the UE stops monitoring CB-RNTI. In other words, the UE stops receiving the contention-based uplink grant. Although not depicted in drawing, the UE may perform random access procedure to the eNB after stopping monitoring of the CB-RNTI.

Otherwise, if there is no data to be transmitted on SRB 0, the UE determines whether a CB-RNTI monitoring condition is fulfilled at the corresponding timing at step 1120.

If the CB-RNTI monitoring condition is fulfilled, this means that the necessity of the use of the contention-based uplink grant is high. For example, this is the case that the UE has retained the data having a high priority for long time duration or the data having a high priority occurs newly.

If the CB-RNTI monitoring condition is not fulfilled, the procedure goes to step 1115 and, otherwise, step 1125. At step 1125, the UE monitors the CB-RNTI. If the UE monitors CB-RNTI, this means that the UE monitors the receipt of the uplink grant addressed by the CB-RNTI on the downlink control channel. Although not depicted in drawing, the UE may transmit the data to the eNB according to the resource allocation information of the received contention-based uplink grant.

Fifth Embodiment

The UE transmits a Buffer Status Report message (BSR) to the eNB in order for the eNB to allocate the uplink transmission resource efficiently. The buffer status report message is categorized into one of a period buffer status report message and a regular buffer status report message. The periodic buffer status message is triggered when the timer starting with the transmission of the buffer status report message expires, and the regular buffer status report message is triggered when data having the priority higher than that of the data stored in the UE currently occurs.

Since the regular buffer status report message is more important than the periodic buffer status report message, if the regular buffer status report is triggered, the UE requests the eNB for transmission resource allocation for immediate transmission of the regular buffer status report. Meanwhile, if the periodic buffer state report is triggered without SR, the periodic buffer status report is transmitted in the uplink transmission according to the uplink grant transmitted first after the periodic buffer status report has been triggered.

The periodic buffer status report or the regular buffer status report has to be transmitted as immediate as possible and assigned high transmission reliability. If putting weight on the quick transmission, it is preferred to transmit the buffer status report in contention-based uplink transmission and, otherwise if putting weight on the transmission reliability, it is preferred to giving up the buffer status report in the contention-based uplink transmission.

In the fifth embodiment of the present invention, the periodic buffer status report and the regular buffer status report are carried in the contention-based uplink transmission and retriggered after completion of the contention-based uplink transmission immediately in order to satisfy both the two conditions above.

Figure 12:
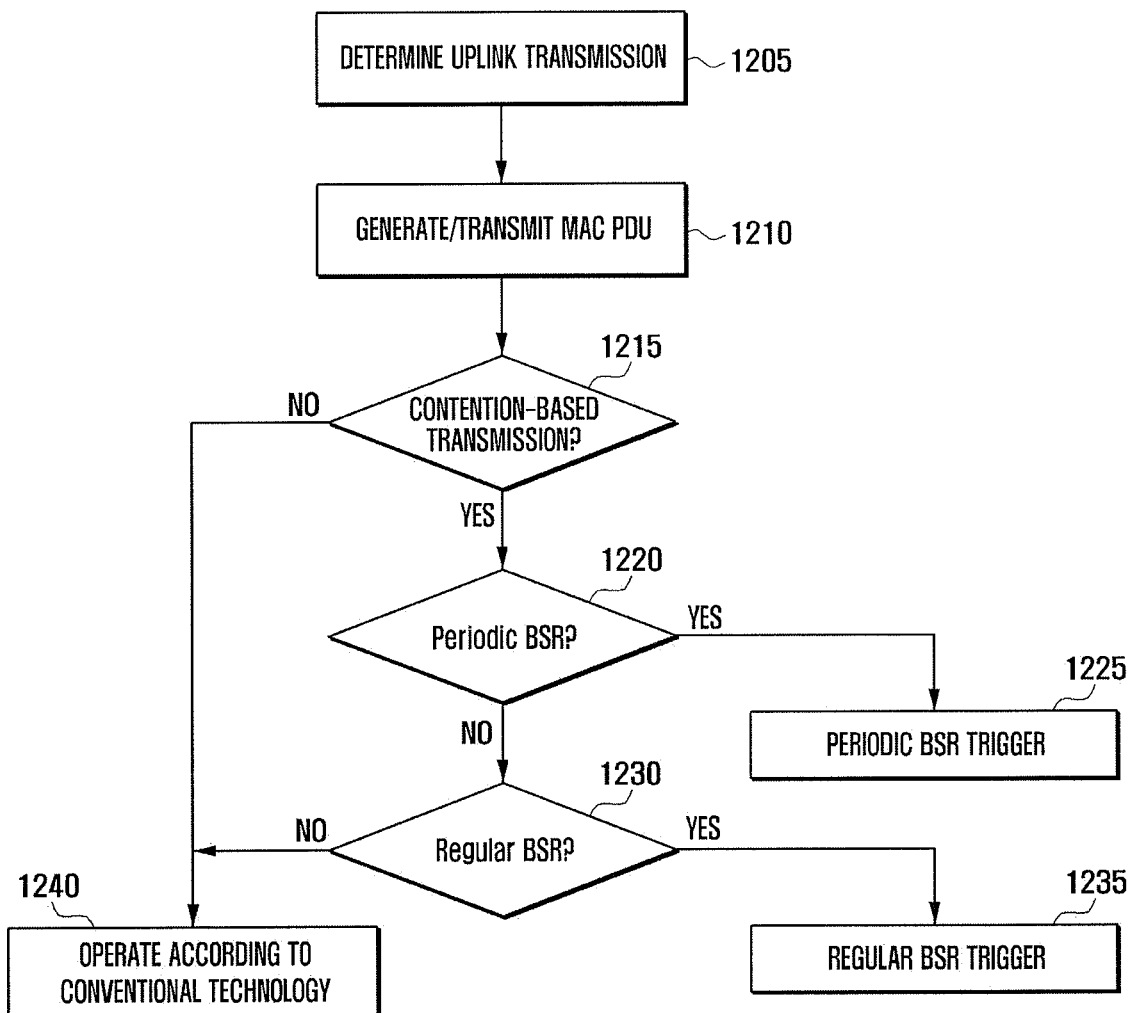
FIG. 12 is a flowchart illustrating a procedure of the UE according to the fifth embodiment of the present invention.

FIG. 12 is a flowchart illustrating a procedure of the UE according to the fifth embodiment of the present invention.

After determining uplink transmission at step 1205, the UE generates and transmits a MAC PDU at step 1210. The UE determines whether the uplink transmission has been contention-based transmission at step 1215. If the uplink transmission has not been contention-based transmission, the UE operates according to the legacy technology at step 1240 and, otherwise, goes to step 1220. At step 1220, the UE determines whether the periodic BSR has been carried in the uplink transmission. If the periodic BSR has been carried, the procedure goes to step 1225 and, otherwise, step 1230. At step 1225, the UE retriggers the periodic BSR to guarantee the transmission reliability of the periodic BSR. That is, the UE sends the MAC PDU including the periodic BSR in the next uplink transmission. At step 1230, the UE determines whether the regular BSR has been carried in the uplink transmission. If the regular BSR has been carrier, the procedure goes to step 1235 and, otherwise, step 1240. At step 1235, the UE retriggers the regular BSR to guarantee the transmission reliability of the regular BSR. That is, the UE triggers SR to request the eNB for uplink transmission resource allocation and performs uplink retransmission carrying the MAC PDU including the regular BSR.

Sixth Embodiment

Since the contention-based transmission has low transmission reliability, the transmission failure probability is high and thus it is important to check quickly whether the transmission has succeeded or failed. The present invention proposes a method and apparatus that is capable of checking the success or failure of the RLC PDU transmission in contention-based mode by setting a poll bit of the RLC PDU transmitted in contention-based mode to 1 without subsequent RLC PDU transmission.

Figure 13:
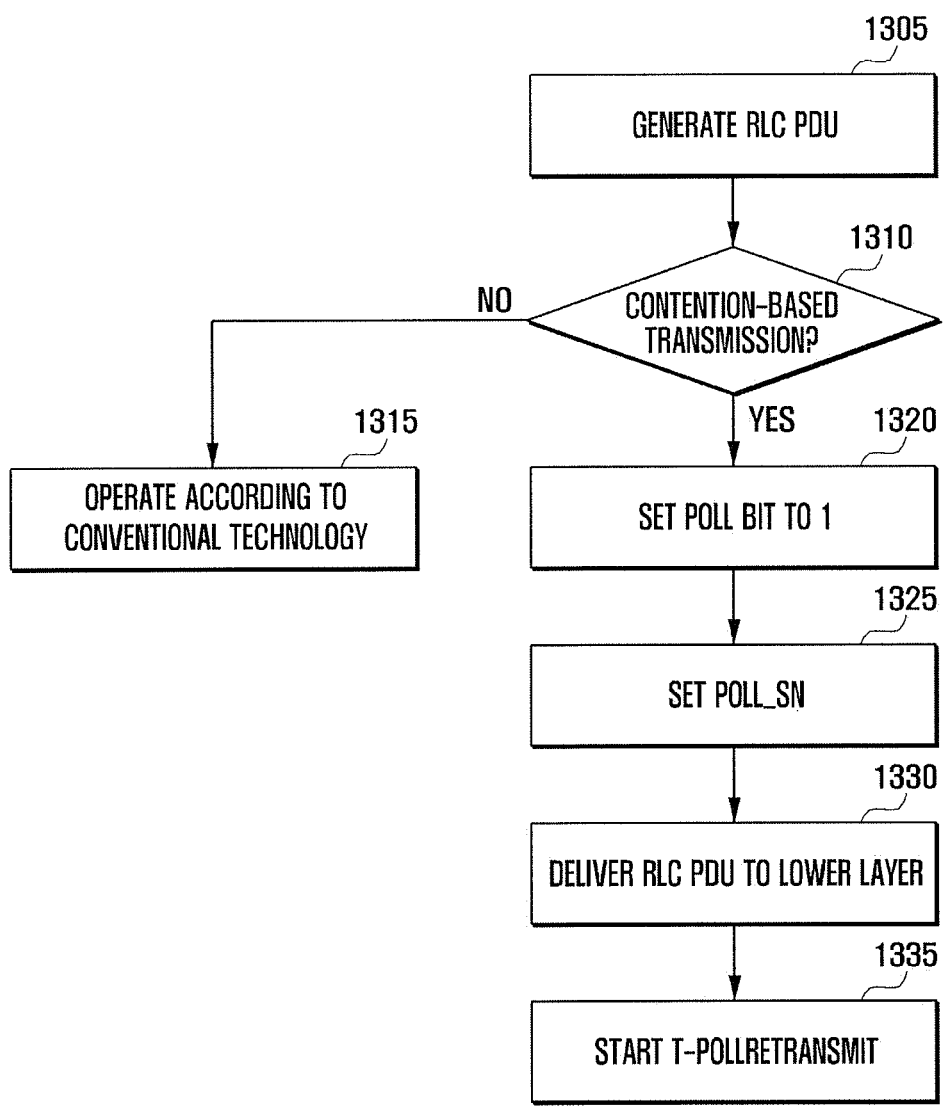
FIG. 13 is a flowchart illustrating a procedure of the UE according to the sixth embodiment of the present invention.

FIG. 13 is a flowchart illustrating a procedure of the UE according to the sixth embodiment of the present invention.

The RLC entity generates an RLC PDU at step 1305. The RLC entity determines whether to transmit the generated RLC PDU in contention-based mode. If the RLC PDU is not transmitted in contention-based mode, the UE goes to step 1315 to operate according to the conventional technology and, otherwise if the RLC PDU is transmitted in contention-based mode, step 1320. In order to check the transmission success/failure of the RLC PDU sent in the contention-based mode, the UE set the poll bit of the RLC PDU to 1 at step 1320. The poll bit is a predetermined bit of the header of the RLC PDU and, if the poll bit is set to 1, the counterpart RLC entity generates and transmits the RLC status report message. The RLC entity saves the sequence number of the RLC PDU having the poll bit set to 1 into a variable called POLL_SN at step 1325. The sequence number of the RLC PDU at a certain timing is identical with the value obtained by subtracting 1 from a variable called VT(S) such that the POLL_SN is set to the value obtained 1 from the VT(S) at the corresponding timing. The RLC entity delivers the RLC PDU to a lower layer at step 1330 and starts T-pollretransmit.

T_pollretransmit is of guaranteeing the transmission reliability of the RLC PDU own which poll bit is set to 1 such that, if the status report message is not received before the expiry of T_pollretransmit, the RLC entity sets the poll bit of the next RLC PDU to request for the status report message again. In the sixth embodiment of the present invention, if the expired T_pollretransmit has run for the RLC PDU transmitted in contention-based mode, the UE retransmits the RLC PDU (having the high transmission failure probability) transmitted in contention-based mode other than resetting the poll bit.

Figure 14:
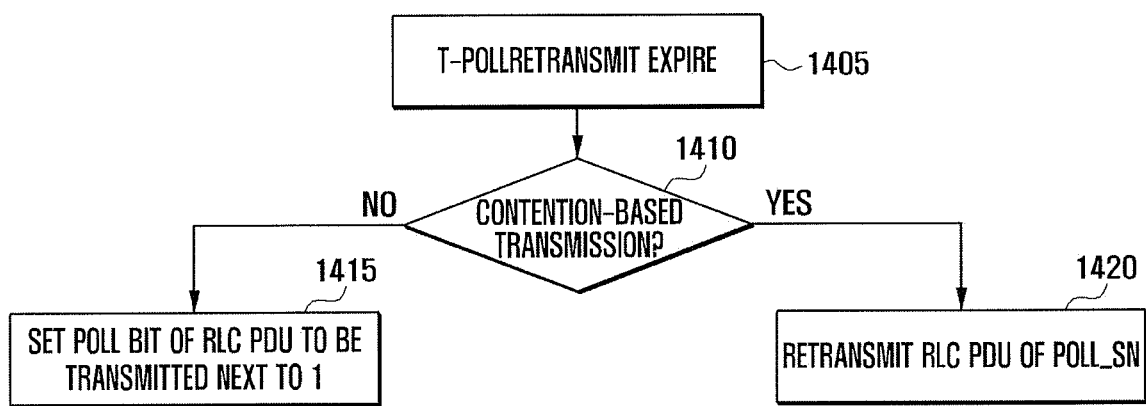
FIG. 14 is a flowchart illustrating a procedure of the UE in expiry of T_pollretransmit according to the sixth embodiment of the present invention.

FIG. 14 is a flowchart illustrating a procedure of the UE in expiry of T_pollretransmit according to the sixth embodiment of the present invention. If T_pollretransmit timer expires at step 1405, the RLC entity goes to step 1410. At step 1410, the RLC entity determines whether the T_pollretransmit timer has been triggered due to RLC PDU transmitted in contention-based mode, i.e. if the timer has expired in a situation where the poll bit has been set to 1 while transmitting a certain RLC PDU in contention-based mode with the start of the T_pollretransmit timer. If it is determined that the T_pollretransmit timer has been triggered due to the RLC PDU transmitted in contention-based mode, the RLC entity goes to step 1420. If it is determined that the T_pollretransmit timer has been triggered due to other reason than the RLC PDU transmitted in contention-based mode, the RLC entity goes to step 1415.

If the procedure goes to step 1420, this means that the transmission failure probability of the RLC PDU transmitted in contention-based mode is high such that the RLC PDU having the poll bit set to 1 and transmitted in contention-based mode is retransmitted. This is identical with the retransmission of the RLC PDU having the sequence number saved in POLL_SN.

At step 1515, the RLC entity sets the poll bit of the RLC PDU to be transmitted next to 1, updates the POLL_SN, and starts T_pollretransmit timer according to the convention technology.

Figure 15:
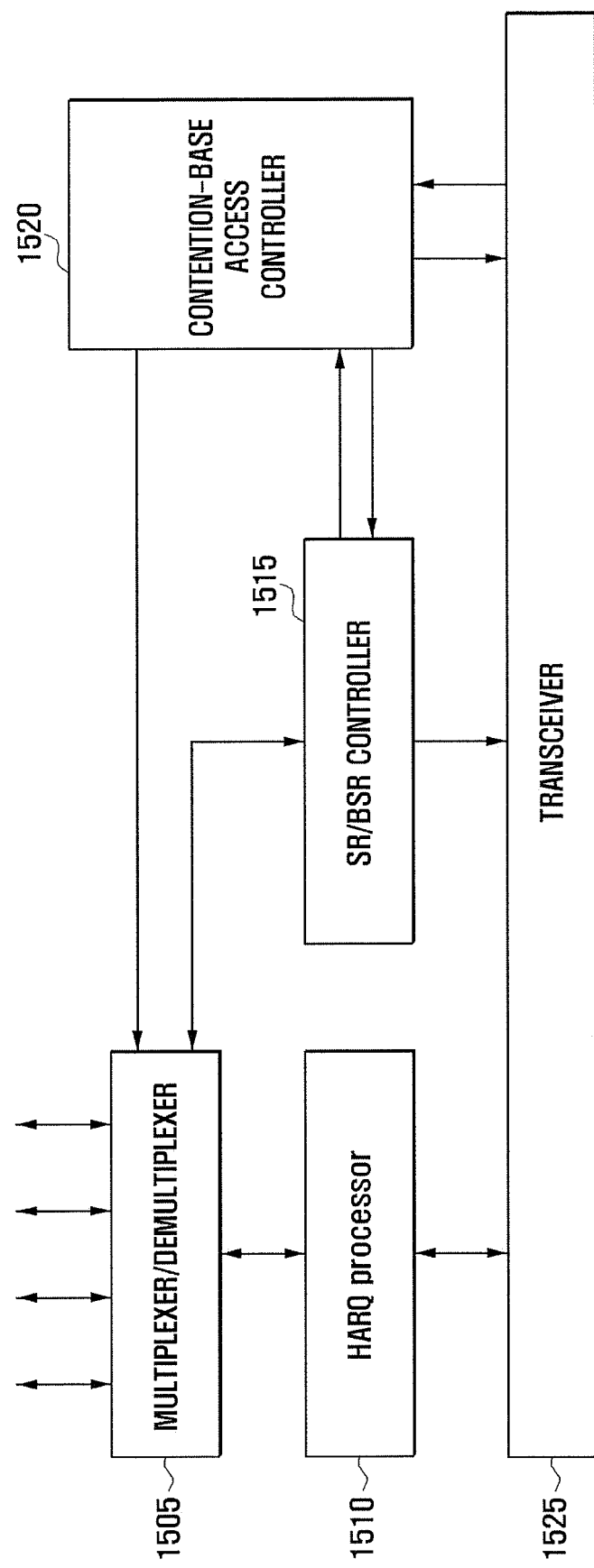
FIG. 15 is a block diagram illustrating the UE according to the embodiment of the present invention.

FIG. 15 is a block diagram illustrating the UE according to the embodiment of the present invention.

It is noted that the higher layer entities are not depicted in the UE block diagram of FIG. 15. The high layer entities may include PDCP and RLC entities activated per logical channel. As shown in FIG. 15, the UE includes a multiplexer/demultiplexer 1505, an HARQ processor 1510, an SR/BSR controller 1515, a contention-based access controller 1520, and a transceiver 1525.

The contention-based access controller interprets the contention-based uplink grant received through downlink control channel, determines whether to UEs contention-based uplink grant, and controls the transceiver to perform uplink transmission according to the determination result. In the first embodiment of the present invention, the contention-based access controller checks the logical channel on which contention-based access is allowed and controls, when the contention-based uplink grant is received, the multiplexer/demultiplexer to perform logical channel selection process in consideration of the data on the logical channels on which the contention-based access is allowed. The contention-based access controller also determines whether to perform contention-based uplink transmission in consideration of the padding bit state of the MAC PDU to be generated and the uplink transmission output state.

In the second embodiment of the present invention, if multiple contention-based uplink grants are received, the contention-based uplink access controller selects the uplink grant indicating the size closest to the data amount to be carried in contention-based uplink transmission and controls the multiplexer/demultiplexer and the transceiver to perform uplink transmission according to the grant.

In the third embodiment of the present invention, the contention-based uplink access controller monitors whether the contention-based uplink transmission collide with the message 3 transmission or the preamble transmission and, if collision is detected, controls the multiplexer/demultiplexer and the transceiver to give up the contention-based uplink transmission.

In the fourth embodiment of the present invention, the contention-based uplink access controller determines whether to perform the contention-based uplink transmission depending on whether SRB 0 data exists.

In the fifth embodiment of the present invention, the contention-based uplink access controller controls the SR/BSR controller to trigger the BSR again when the periodic BSR or the regular BSR is transmitted in contention-based mode.

The SR/BSR controller monitors the occurrence of high layer data to determine BSR trigger. If BSR is triggered, the SR transmission procedure is triggered. Also, the SR/BSR controller triggers the periodic BSR or regular BSR according to the instruction of the contention-based uplink access controller.

The transceiver 1525 of the UE is the device for transmitting/receiving MAC PDU or control information through a radio channel. The transceiver is the device for receiving HARQ packets. The HARQ processor 1510 is a set of soft combining buffers for performing HARQ operation and identified by HARQ process identifier. The multiplexer/demultiplexer performs logical channel selection process and notifies of the transmission data amount per logical channel. the multiplexer/demultiplexer also combines the data received through multiple logical channels to generate a MAC PDU or demultiplexes the MAC PDU into MAC SDUs to deliver to appropriate logical channel.

Figure 16:
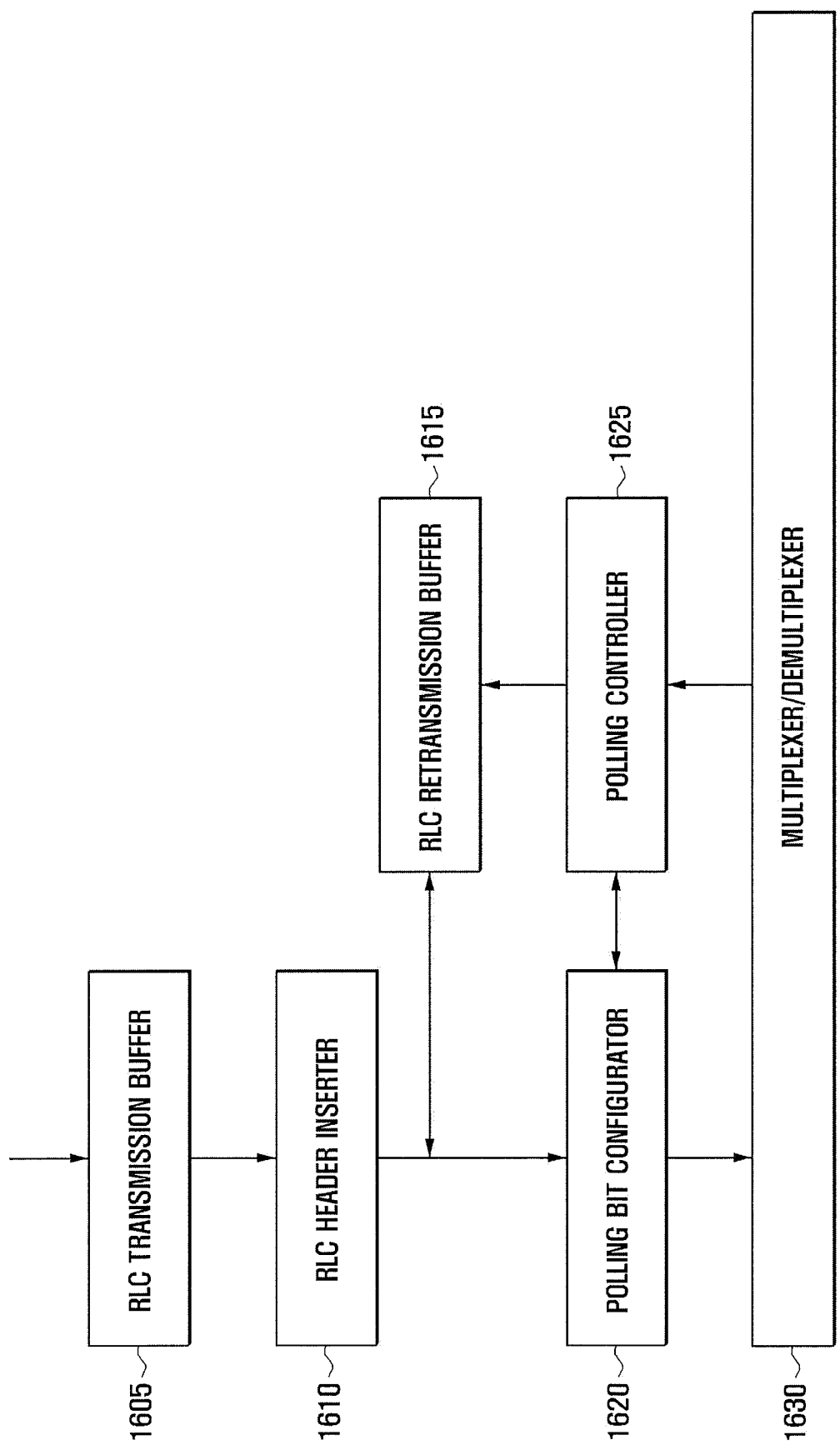
FIG. 16 is a block diagram illustrating the UE RLC entity according to the sixth embodiment of the present invention.

FIG. 16 is a block diagram illustrating the UE RLC entity according to the sixth embodiment of the present invention.

The RLC entity includes an RLC transmission buffer 1605, an RLC header inserter 1610, an RLC retransmission buffer 1615, a polling bit configurator 1620, and a polling controller 1625, and is connected to a multiplexer/demultiplexer 1630.

The RLC transmission buffer is the buffer for buffering PDCP PDUs and, when RLC PDU is generated, aggregates the PDCP PDUs in match with the payload size of the RLC PDU or delivers a part to the RLC header inserter. The RLC header inserter inserts predetermined header fields (RLC sequence number, length indicator, etc.) in the payload of the RLC PDU to generate the RLC PDU. The RLC PDU generated by the RLC header inserter is delivered to the polling bit configurator and the RLC retransmission buffer. The RLC retransmission buffer retransmits the corresponding PDU in response to the specific RLC PDU retransmission instruction from the polling controller or the state retransmission controller (not shown).

The polling controller controls the polling bit configurator to set the polling bit of the RLC PDU satisfying a predetermined condition to 1. The predetermined condition can be the contention-based transmission of the RLC PDU. If the RLC PDU of which polling bit is set to 1 is delivered to the lower layer, the t-pollretransmit starts. If the t-pollretransmit expires and if the RLC PDU has triggered the t-pollretransmit, the polling controller controls the RLC retransmission buffer to retransmit the RLC PDU corresponding to the POLL_SN.

Figure 17:
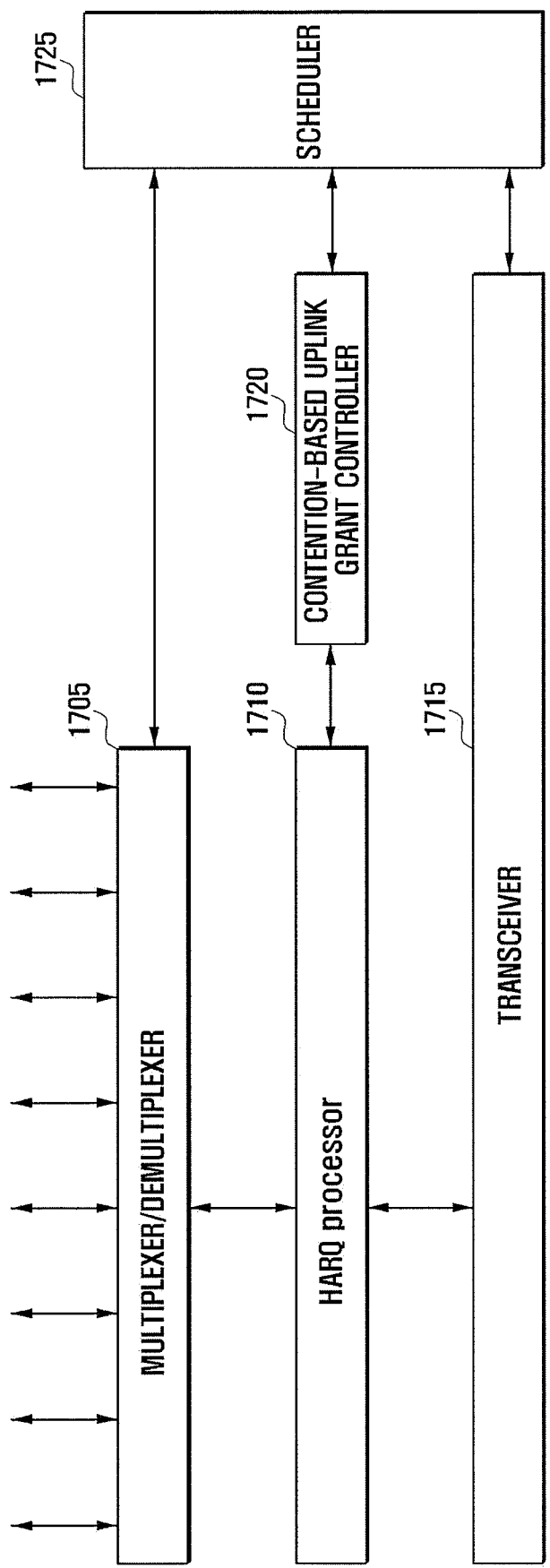
FIG. 17 is a block diagram of the eNB according to an embodiment of the present invention.

FIG. 17 is a block diagram of the eNB according to an embodiment of the present invention.

It is noted that the higher layer entities is not depicted in the eNB block diagram of FIG. 17. As shown in FIG. 17, the eNB includes a multiplexer/demultiplexer 1705, an HARQ processor 1710, a transceiver 1715, a contention-based uplink grant controller 1720, and a scheduler 1725.

The contention-based uplink grant controller determines whether to allocate resource using contention-based uplink grant in consideration of the uplink transmission resource status. The contention-based uplink grant controller determines the MCS level to be adopted to the contention-based uplink grant. The contention-based uplink grant indicating large amount of data transmission is transmitted at high MCS level such that only the UEs having good channel conditions can receive the uplink grant while the contention-based uplink grant indicating small amount of data transmission is transmitted at low MCS level such that the UE having bad channel conditions may receive too. The contention-based uplink grant controller notifies the scheduler of the contention-based uplink grants determined for resource allocation and the MCS levels applied to the respective grants. The scheduler determines the UEs and uplink transmission resource in consideration of the priorities and amounts of the reported uplink data and generates the uplink grants to the transceiver according to the determination results. At this time, the scheduler generates the contention-based uplink grants requested for transmission by the contention-based uplink grant controller to the transceiver. The scheduler controls the transceiver to apply the appropriate MCS levels for the respective uplink grants. The scheduler also controls the transceiver to receive and decode the uplink transmission indicated by the uplink grant. If there is the uplink transmission resource left after scheduling, the scheduler notifies the contention-based uplink grant controller of this.

The transceiver 1715 is the device transmits and receives MAC PDUs or control information through a radio channel. The HARQ processor 1710 is a set of soft combining buffers for performing HARQ operation and identified by HARQ process identifier. The multiplexer/demultiplexer combines the data received through multiple logical channels to generate a MAC PDU or demultiplexes the MAC PDU into MAC SDUs to deliver to appropriate logical channel.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

What is claimed is:

1. A method for performing an uplink transmission by a terminal in a mobile communication system supporting a carrier aggregation, the method comprising:

receiving, from a base station, first configuration information of a first logical channel and second configuration information of a second logical channel for the terminal, the first configuration information of the first logical channel indicates whether data of the first logical channel is allowed to be transmitted on a cell associated with a contention based resource, and the second configuration information of the second logical channel indicates whether data of the second logical channel is allowed to be transmitted on the cell associated with the contention based resource;

identifying that a first data of the first logical channel is not allowed to be transmitted on the cell based on the first configuration information, and second data of the second logical channel is allowed to be transmitted on the cell based on the second configuration information;

determining whether an uplink grant received from the base station is associated with the cell;

transmitting, to the base station, all or part of the first data of the first logical channel and the second data of the second logical channel determined based on a priority order of the first logical channel and a priority order of the second logical channel using the uplink grant, in case that the uplink grant is not associated with the cell; and transmitting, to the base station, the second data of the second logical channel using the uplink grant, in case that the uplink grant is associated with the cell.

2. The method of claim 1, wherein a collision with another uplink transmission takes place in the cell.

3. The method of claim 1, wherein the first configuration information and the second configuration information are included in a radio resource control (RRC) message.

4. The method of claim 1, wherein the first logical channel comprises a signaling radio bearer (SRB) 0.

5. The method of claim 1, wherein the cell can be shared based on contention by more than one terminal.

6. A method for performing an uplink transmission by a base station in a mobile communication system supporting a carrier aggregation, the method comprising:
transmitting, to a terminal, first configuration information of a first logical channel and second configuration information of a second logical channel for the terminal, the first configuration information of the first logical channel indicates whether data of the first logical channel is allowed to be transmitted on a cell associated with a contention based resource, and the second configuration information of the second logical channel indicates whether data of the second logical channel is allowed to be transmitted on the cell associated with the contention based resource;
transmitting an uplink grant to the terminal;
receiving, from the terminal, all or part of a first data of the first logical channel and a second data of the second logical channel determined based on a priority order of the first logical channel and a priority order of the second logical channel using the uplink grant, in case that the uplink grant is not for a transmission on the contention based resource; and
receiving, from the terminal, the second data of the second logical channel using the uplink grant, in case that the uplink grant is associated with the cell,
wherein the first data of the first logical channel is not allowed to be transmitted on the cell, and the second data of the second logical channel is allowed to be transmitted on the cell.

7. The method of claim 6, wherein a collision with another uplink transmission takes place in the cell.

8. The method of claim 6, wherein the first configuration information and the second configuration information are included in a radio resource control (RRC) message.

9. The method of claim 6, wherein the first logical channel comprises a signaling radio bearer (SRB) 0.

10. The method of claim 6, wherein the cell can be shared based on contention by more than one terminal.

11. A terminal in a mobile communication system supporting a carrier aggregation, the terminal comprising:
a transceiver configured to transmit and receive signals; and
a controller configured to:
control the transceiver to receiving, from a base station, first configuration information of a first logical channel and second configuration information of a second logical channel for the terminal, the first configuration information of the first logical channel indicates whether data of the first logical channel is allowed to be transmitted on a cell associated with a contention based resource, and the second configuration information of the second logical channel indicates whether data of the second logical channel is allowed to be transmitted on the cell associated with the contention based resource,
identify that first data of the first logical channel is not allowed to be transmitted on the cell based on the first configuration information, and second data of the second logical channel is allowed to be transmitted on the cell based on the second configuration information,
determine whether uplink grant received from the base station is associated with the cell,
control the transceiver to transmit, to the base station, all or part of the first data of the first logical channel and the second data of the second logical channel determined based on a priority order of the first logical channel and a priority order of the second logical channel using the uplink grant, in case that the uplink grant is not associated with the cell, and
control the transceiver to transmit, to the base station, the second data of the second logical channel using the uplink grant, in case that the uplink grant is associated with the cell.

12. The terminal of claim 11, wherein a collision with another uplink transmission takes place in the cell.

13. The terminal of claim 11, wherein the first configuration information and the second configuration information are included in a radio resource control (RRC) message.

14. The terminal of claim 11, wherein the first logical channel comprises a signaling radio bearer (SRB) 0.

15. The terminal of claim 11, wherein the cell can be shared based on contention by more than one terminal.

16. A base station in a mobile communication system, the base station comprising:
a transceiver configured to transmit and receive signals; and
a controller configured to:
control the transceiver to transmit, to a terminal, first configuration information of a first logical channel and second configuration information of a second logical channel for the terminal, the first configuration information of the first logical channel indicates whether data of the first logical channel is allowed to be transmitted on a cell associated with a contention based resource, and the second configuration information of the second logical channel indicates whether data of the second logical channel is allowed to be transmitted on the cell associated with the contention based resource,
control the transceiver to transmit an uplink grant to the terminal,
control the transceiver to receive, from the terminal, all or part of a first data of the first logical channel and a second data of the second logical channel determined based on a priority order of the first logical channel and a priority order of the second logical channel using the uplink grant, in case that the uplink grant is not for a transmission on the contention based resource, and
control the transceiver to receive, from the terminal, the second data of the second logical channel using the uplink grant, in case that the uplink grant is associated with the cell, wherein the first data of the first logical channel is not allowed to be transmitted on the cell, and the second data of the second logical channel is allowed to be transmitted on the cell.

17. The base station of claim 16, wherein a collision with another uplink transmission takes place in the cell.

18. The base station of claim 16, wherein the first configuration information and the second configuration information are included in a radio resource control (RRC) message.

19. The base station of claim 16, wherein the first logical channel comprises a signaling radio bearer (SRB) 0.

20. The base station of claim 16, wherein the cell can be shared based on contention by more than one terminal.

\* \* \* \* \*